United States Patent [19]

Cudaback

[11] Patent Number: 4,872,976

[45] Date of Patent: Oct. 10, 1989

[54] OIL FILTER WITH MULTIPLE FUNCTION VALVE

[75] Inventor: Roger L. Cudaback, Gibbon, Nebr.

[73] Assignee: Baldwin Filters, Inc., Kearney, Nebr.

[21] Appl. No.: 223,395

[22] Filed: Jul. 25, 1988

[51] Int. Cl.[4] .............................................. B01D 27/10
[52] U.S. Cl. ..................................... 210/130; 210/138; 210/440
[58] Field of Search ............... 210/117, 130, 133, 136, 210/168, 437, 440, 443, 444

[56] References Cited

U.S. PATENT DOCUMENTS

| | | | |
|---|---|---|---|
| 2,995,249 | 8/1961 | Boewe et al. | 210/130 |
| 3,036,711 | 5/1962 | Wilhelm | 210/130 |
| 3,231,089 | 1/1966 | Thornton | 210/136 |
| 4,127,484 | 11/1978 | Walulik et al. | 210/130 |

Primary Examiner—Ivars Cintins
Attorney, Agent, or Firm—Leydig, Voit & Mayer, Ltd.

[57] ABSTRACT

An elastomeric valve member coacts with a valve seat and an apertured plate to control the flow of oil between the inlet and outlet of an oil filter for an internal combustion engine. When the engine is shut down, the valve member seals against both the valve seat and the plate to hold oil in the filter and prevent such oil from returning to the crankcase via the inlet. Under normal running conditions, the valve member unseals with respect to the plate to permit oil to flow between the inlet and outlet by way of the filter element of the filter. If the pressure differential between the inlet and the outlet exceeds a predetermined value, the valve member unseals with respect to the valve seat to enable the oil to bypass the filter element and to flow directly from the inlet to the outlet.

11 Claims, 3 Drawing Sheets

OIL FILTER WITH MULTIPLE FUNCTION VALVE

BACKGROUND OF THE INVENTION

This invention relates to a filter with a filter element for screening the oil of an internal combustion engine and, more specifically, to a filter in which valve means control the flow of oil between the inlet and outlet of the filter.

Most prior filters of the type with which the invention is concerned have two separate valves. One valve is a flow control valve which causes the oil to enter the filter at one location and discharge from another location after flowing through the filter element and which holds oil in the filter when the engine is shut down. The second valve is a pressure relief valve which, under certain conditions, causes the flow to bypass the filter element altogether and to pass directly from the inlet to the outlet of the filter.

While most commercially available filters utilize separate flow control and pressure relief valves, there are filters in which the valve functions are combined into a unitary structure. Typical of a filter with a multiple function valve is that disclosed in Thornton et al U.S. Pat. 3,567,022. The multiple function valve structure of the Thornton et al patent, however, is relatively complex and is comparatively expensive to manufacture and assemble.

SUMMARY OF THE INVENTION

The general aim of the present invention is to provide a filter having a new and improved multiple function valve which is of relatively low cost as a result of having fewer components than prior multiple function valve structures and as a result of those components lending themselves to extremely quick and easy assembly.

A further object of the invention is to provide a filter with a multiple function valve which seals more effectively than prior valves and reduces the likelihood of oil bypassing the filter element under normal operating conditions.

Still another object is to provide a multiple function valve which remains reliable and trouble-free over the expected life of the filter.

A more detailed object of the invention is to achieve the foregoing through the provision of a novel multiple function valve having three primary components, namely, a flexible one-piece valve member, a valve seat and a spring for urging the valve member into sealing engagement with the valve seat.

These and other objects and advantages of the invention will become more apparent from the following detailed description when taken in conjunction with the accompanying drawings.

DETAILED DESCRIPTION OF THE PREFERRED EMBODIMENT

Figure 1:
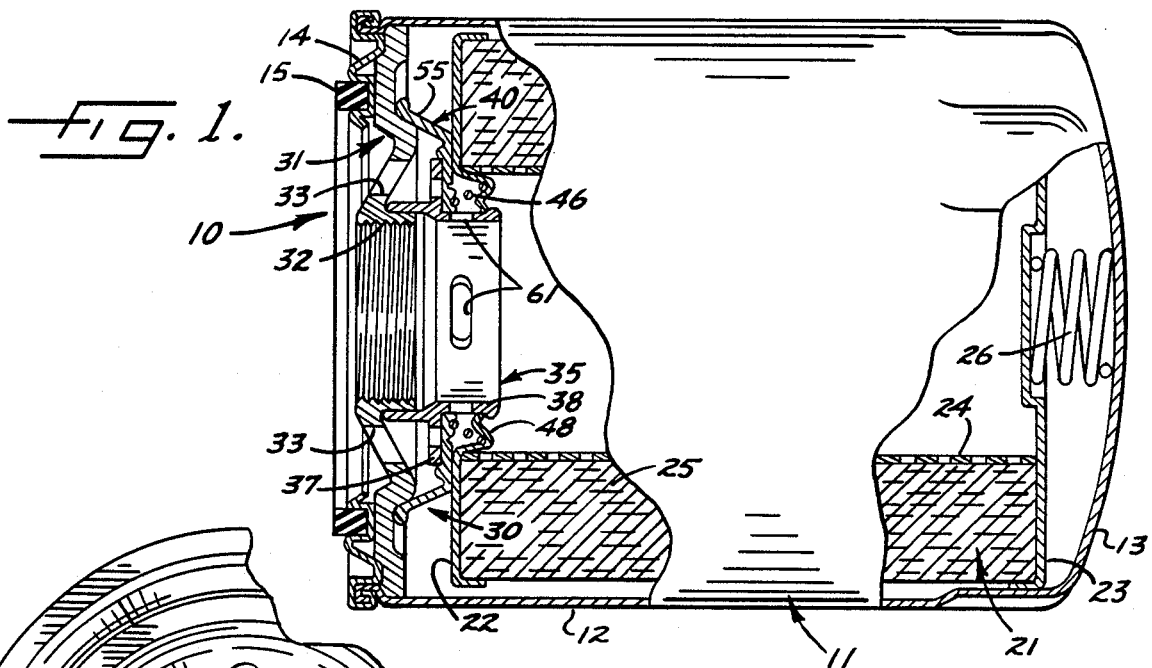
FIG. 1 is a side elevational view of an oil filter equipped with a unique multiple function valve incorporating the unique features of the present invention, portions of the filter being broken away and shown in section.

For purposes of illustration, the invention has been shown in the drawings as incorporated in an oil filter 10 of the type used on an internal combustion engine. The filter includes a sheet metal housing 11 which is generally in the shape of a deep can, the housing having a cylindrical side wall 12 and an end wall 13 integral with one end of the side wall. Seamed to the opposite end of the side wall 12 is an annular sheet metal retainer 14 for a sealing ring 15.

When the filter 10 is attached to the engine, the ring 14 seals against an adaptor 17 (FIG. 3) having an inlet passage 18 for conducting oil to the filter and an outlet passage 19 for returning oil from the filter to the engine. The outlet passage 19 is defined in part within a threaded fitting 20 which is an integral part of the adaptor 17 and which projects axially toward the filter.

Disposed within the housing 11 is a tubular filter element 21 consisting of two end caps 22 and 23, a perforated inner core 24 and a suitable filter media 25 sandwiched between the caps and captivated against the core. The core 24 defines the inner wall of the filter element 21 while the outer wall of the element is defined by the outer side of the filter media 25. A coil spring 26 is compressed between the end cap 23 and the housing end wall 13 and urges the filter element toward the adaptor 17.

In filters of the same general type as the filter 10, it is conventional to control the flow of oil between the inlet 18 and the outlet 19 of the adaptor 17 in accordance with prevailing engine conditions. When the engine is shut down, oil is prevented from draining from the filter to the inlet 18 in order to retain oil in the filter. Under normal running conditions, oil is forced to flow from the inlet 18 to the outlet 19 by way of the filter element 21 so as to cause the filter element to screen contaminants from the oil. If the engine is started at very low temperatures or if the filter element 21 is heavily plugged, oil bypasses the filter element altogether and flows directly from the inlet 18 to the outlet 19 in order to insure an adequate and continuous supply of oil to the engine.

In accordance with the present invention, an extremely simple and inexpensive multiple function valve 30 is incorporated in the filter 10 to cause the oil to flow through the filter element 21 under normal conditions, to cause the oil to bypass the filter element during abnormal conditions, and to retain oil in the filter when the engine is shut down. The multiple function valve of the invention is particularly characterized in that it is made up of relatively few parts which may be made and assembled at comparatively low cost.

More specifically, the valve 30 coacts with a specially configured end plate 31 which is located within the housing 11 adjacent the retainer ring 14. The plate may be stamped from steel or molded of suitable plastic and is located with its outer peripheral portion positioned adjacent the inner side of the housing wall 12 and in engagement with the inboard face of the retainer 14. The plate is annular and is formed with an internally threaded hub 32 which receives the fitting 20 of the adaptor 17 to enable the filter 10 to be screwed onto the adaptor.

Figure 2:
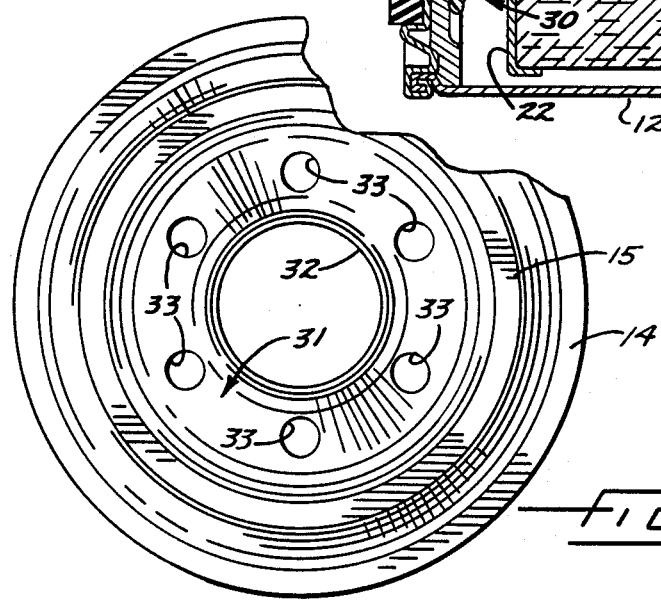
FIG. 2 is a fragmentary end view of the filter as seen from the left of FIG. 1.
Figure 3:
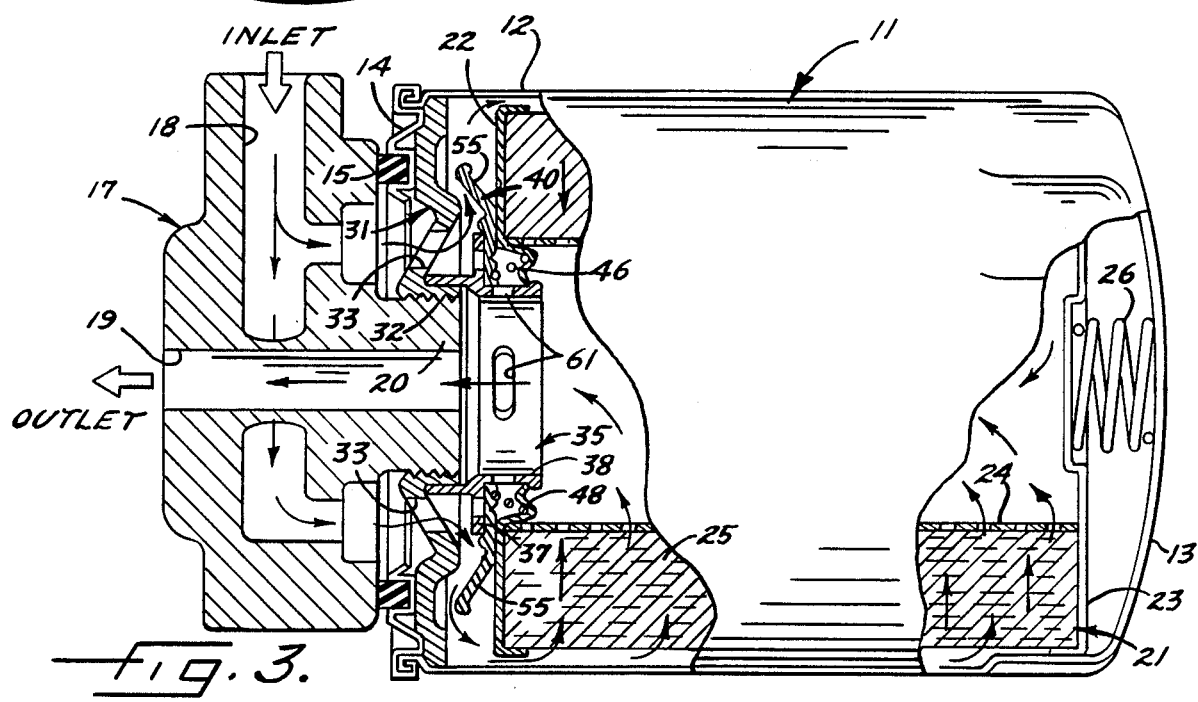
FIG. 3 is a view similar to FIG. 1 but shows the filter attached to an engine and with the valve permitting normal flow through the filter.
Figure 4:
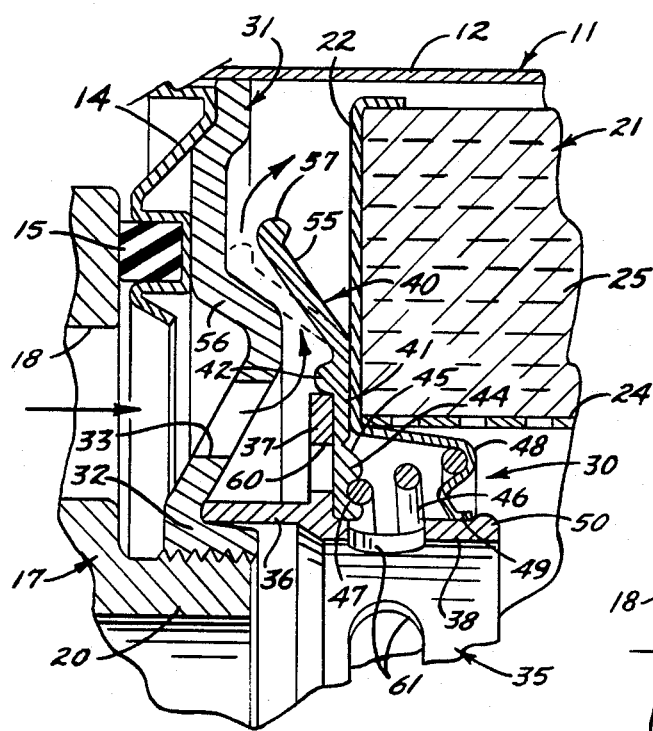
FIG. 4 is an enlarged view of certain parts shown in FIG. 3.

As shown in FIGS. 2 to 4, that portion of the plate 31 immediately adjacent the hub 32 is generally frustoconical in shape and is formed with several (herein, six) angularly spaced inlet openings 33. The inlet openings communicate with the inlet 18 of the adaptor 17 and serve to admit oil into the filter housing 11.

Pursuant to the invention, the valve 30 includes a novel valve seat 35 (FIGS. 4 to 7) preferably made of plastic and having a central sleeve 36 which is telescoped over the hub 32 of the plate 31. A radially outwardly extending flange 37 is molded integrally with the sleeve 36 about midway between the ends of the valve seat 35. Projecting axially from the flange and into the core 24 of the filter element 21 is another sleeve 38 formed integrally with the sleeve 36 and having inside and outside diameters somewhat smaller than those of the sleeve 36.

Further in keeping with the invention, the valve 30 includes a uniquely shaped valve member 40 (FIGS. 4, 5, 8 and 9) which coacts with the plate 31 and the valve seat 35 to control the flow of oil through the filter 10. The valve member 40 is molded of rubber or other resiliently yieldable material and is in the form of a ring which is telescoped over the sleeve 38 to hold the valve member centered in assembled relation with the valve seat 35. The valve member includes an intermediate section 41 disposed in a radial plane and sandwiched between the end cap 22 and the flange 37. An annular bead 42 projects from the outboard face of the valve member intermediate section 41 and hugs the peripheral edge of the flange 37 to help keep the valve member 40 in a centered position relative to the valve seat 35.

The valve member 40 includes a first valve portion or flapper 44 which is defined by an annulus of the inner peripheral portion of the valve member. The inner edge of the flapper 44 encircles the sleeve 38 while a generally V-shaped groove 45 is formed in the valve member at the outer periphery of the flapper. Normally, the flapper lies in the same radial plane as the intermediate section 41 of the valve member (see FIG. 4) but, by virtue of the groove 45, the flapper may swing out of the plane of the intermediate section to the hinged position shown in FIG. 5. Swinging of the flapper to its hinged position is resisted by a coiled compression spring 46 which preferably is conical in shape. The end coil at the small end of the spring seats in a groove 47 (FIG. 9) in the adjacent face of the flapper 44 while the end coil at the large end portion of the spring seats in an annular channel formed in a sheet metal collar 48 (FIG. 4) which is integral with the inner margin of the end cap 22. The inner periphery of the collar is defined by an axially extending lip 49 which tightly engages the sleeve 38 of the valve seat 35. An outwardly projecting annular bead 50 is formed around the inboard end of the sleeve and is engaged by the free edge of the lip 49 so as to keep the valve seat in assembled relation with the collar. Assembly of the valve seat 35 with the collar 48 may be effected simply by slipping the sleeve 38 endwise into the collar to cause the bead 50 to slip past the lip 49 with a snap fit. Once the assembly is achieved, it is virtually impossible to extract the valve seat from the collar.

The valve member 40 is completed by a second valve portion 55 (FIGS. 4, 5, 8 and 9) which is defined by a generally frustoconical skirt formed integrally with the valve member intermediate section 41 and projecting from that section toward the end plate 31. The skirt 55 normally lies along a frustoconical sealing rib 56 (FIGS. 4 and 5) formed on the inboard face of the end plate 31 just outside of the inlet holes 33. By virtue of the resiliency of the rubber, the skirt 55 is biased into sealing engagement with the surface of the rib 56 while a bead 57 on the outer periphery of the skirt is biased into sealing engagement with the inboard face of the plate 31. The skirt may, however, yield and swing from the position shown in phantom in FIG. 4 to the position shown in full, the skirt hinging relative to the intermediate section 41 along a line just outwardly of the bead 42.

When the engine is not running, the valve member 40 of the filter 10 is positioned as shown in FIG. 1. In this position, the spring 46 urges the flapper 44 into face-to-face sealing engagement with the flange 37 of the valve seat 35 and causes the flapper to close off a series of four angularly spaced passages 60 (FIGS. 4 to 7) formed through the flange. In addition, the memory in the rubber of the valve member 40 biases the skirt 55 and the bead 57 of the valve member into sealing engagement with the rib 56 and the plate 31, respectively. As a results, there is no path for oil to flow from the filter housing 11 to the inlet openings 33 and thus oil is retained in the filter 10 for immediate supply to the engine when the engine is next started.

Under normal running conditions, the oil at the inlet openings 33 is pressurized and acts against the skirt 55 and causes the skirt to hinge from the closed position shown in FIG. 1 to an open position shown in FIGS. 2 and 3. This enables oil to flow around the skirt 55 to the outer wall of the filter element 21, through the filter media 25 and the inner core 24 and then back to the engine's crankcase by way of the tubular valve seat 35 and the outlet 19 in the adaptor 17. As long as normal operating conditions prevail, the spring 46 keeps the flapper 44 sealed against the flange 37 and thus the passages 60 are sealed closed.

Figure 5:
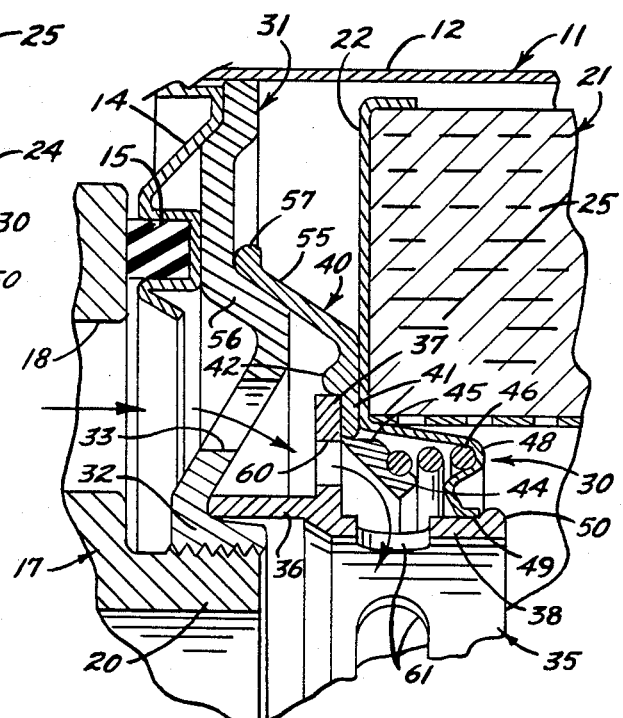
FIG. 5 is a view similar to FIG. 4 but shows the valve positioned to cause oil to bypass the filter element of the filter.
Figure 6:
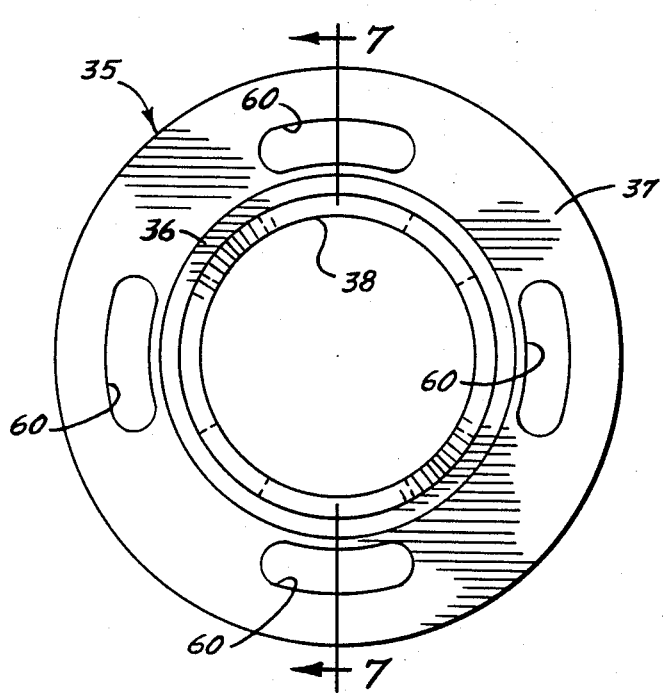
FIG. 6 is an end view of the member which defines the valve seat.
Figure 7:
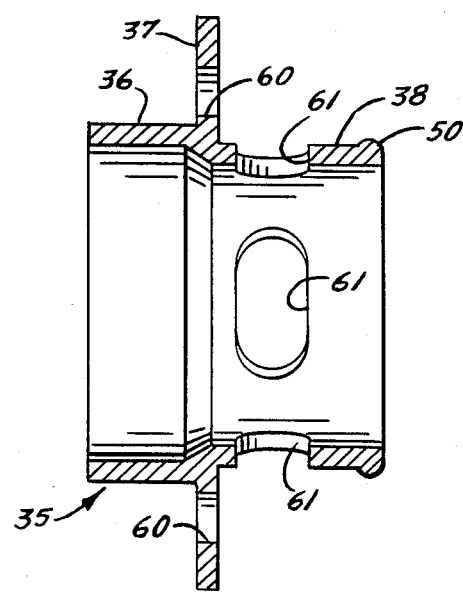
FIG. 7 is a cross-section taken along the line 7—7 of FIG. 6.
Figures 8, 9:
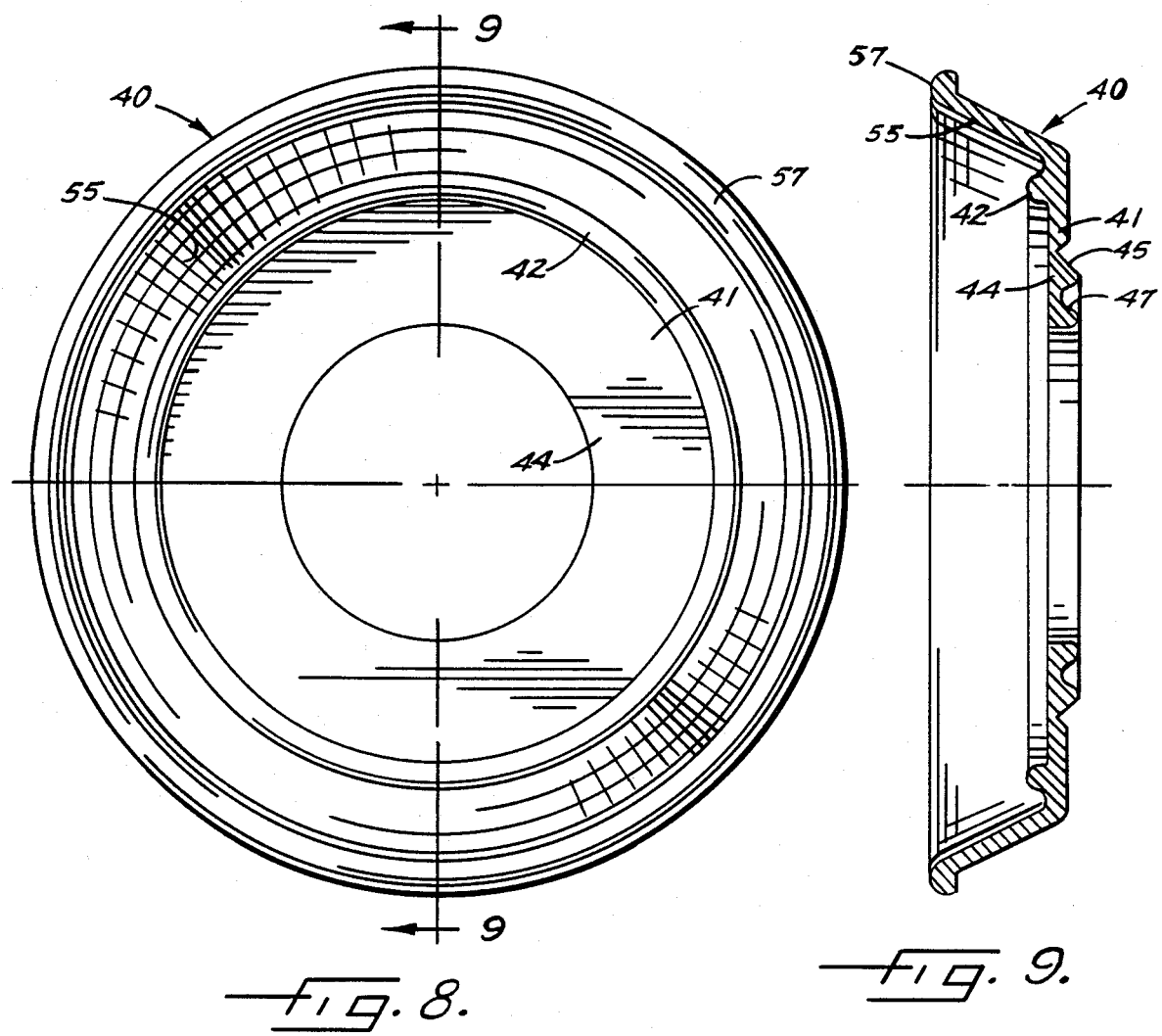
FIG. 8 is an end view of the valve member.
FIG. 9 is a cross-section taken along the line 9—9 of FIG. 8.

The flapper 44 opens the passages 60 and serves as a relief valve under certain conditions. For example, in cold weather, the filter media 25 may remain packed with contaminants for a relatively long period of time thus setting up a relatively high differential pressure between the pressure at the inlet openings 33 and the pressure at the interior of the core 24. Also, such a high pressure differential may exist in neglected use of the filter beyond its capacity to retain contaminants. Under such circumstances, the pressure at the inlet openings 33 becomes sufficiently high to overcome the force of the spring 46 and thus is effective to swing the flapper 44 to an open position as shown in FIG. 5. When the flapper is open, oil may flow through the passages 60 and may pass directly to the outlet 19 by way of angularly spaced ports 61 formed through the sleeve 38 of the valve seat 35. Thus, the filter element 21 is bypassed and oil is pumped directly to the engine so as to insure a continuous and adequate supply of oil to the engine even under abnormal operating conditions.

From the foregoing, it will be apparent that the present invention brings to the art an oil filter 10 having a very simple valve 30 which performs multiple functions. The valve consists of essentially three parts (the valve seat 35, the valve member 40 and the spring 46) which may be assembled quickly and easily with the end cap 22 and the plate 31 present in many conventional filters. Such assembly is effected by telescoping the valve member 40 and the spring 46 onto the sleeve 38 of the valve seat 35 in that order and by telescoping the sleeve 36 of the valve seat 35 onto the hub 32 of the plate 31. The subassembly then is moved into the housing 11 to cause the sleeve 38 to snap through and be held by the collar 48. The retainer ring 14 then is seamed to the housing in a conventional manner. Although the retaining ring is seamed, the components of the valve 30 itself may be assembled without need of pre-fabrication or without need of assembly steps such as welding, seaming or crimping requiring external energy sources.

The foregoing advantages are attained without compromising the overall integrity of the filter 10 since the valve 30 has fewer components and thus effectively reduces the chance of inadvertent oil passage through areas other than the filter media 21. Moreover, improved sealability of the components is achieved in that mating, sealing contact surfaces of the valve member 40 and the valve seat 35 are configured to maintain a continuous seal during operation until such time that the dynamic segments 44 or 55 of the valve react to pressure forces. After reaction to pressure forces or during system shut-down periods, the dynamic portions 44 and 55 of the valve member 40 return to their original molded shape and proper seal location. The static portion 41 of the valve member remains in sealed contact with the flange 37 of the valve seat 35 during all functions and operation. Accordingly, the flow control and the pressure relief functions are performed in a manner that is trouble-free and reliable for the expected life of the filter. The valve seat 35, the valve member 40 and the spring 46 are engaged in such a manner as to preclude disassembly prior to, during and after service of the filter.

I claim:

1. An oil filter comprising a housing, a filter element located in said housing and operable to separate contaminants from oil passing through said element, a plate joined to one end of said housing, a series of angularly spaced inlet openings formed through said plate for admitting oil into said housing, a sleeve joined to said plate near the center thereof and defining an outlet for discharging oil from said housing, oil normally flowing from said inlet openings, through said filter element and out of said outlet when said inlet is pressurized, and valve means for controlling the flow of oil between said inlet openings and said outlet, said valve means comprising a flange projecting radially outwardly from said sleeve and having angularly spaced passages which are operable when open to allow oil to flow directly from said inlet openings to said outlet without passing through said filter element, a valve member comprising a ring made of resiliently yieldable material and telescoped over said sleeve, said valve member having an inner peripheral portion defining a first resiliently yieldable valve portion normally biased fact-to-face against said flange and normally closing said passages to prevent oil from flowing directly from said inlet openings to said outlet, said valve member having a second resiliently yieldable valve portion biased to a closed position against said plate and operable when in said closed position to prevent oil from flowing between said inlet openings and said filter element, said valve member further including an intermediate section disposed in a generally radial plane, said first valve portion normally lying in said plane and being hinged to said intermediate section to yield and swing out of said plane to open said passages, and said second valve portion comprising a skirt extending around and projecting generally axially from the outer periphery of said intermediate section and hinged to yield and swing toward said plane, said second valve portion normally yielding when said inlet openings are pressurized and permitting oil to flow from said inlet openings to said outlet by way of said filter element, and said first valve portion yielding and opening said passages when said inlet openings are pressurized and the pressure differential between said inlet openings and the downstream side of said filter element exceeds a predetermined value whereby oil bypasses said filter element and flows directly from said inlet openings to said outlet by way of said passages, there being a series of angularly spaced and generally radially extending ports formed through said sleeve and communicating with said passages when said first portion of said valve member yields and opens said passages.

2. An oil filter as defined in claim 1 in which said second valve portion of said valve member is defined by an outer peripheral portion of said ring, and a surface on said plate and defining a seat for said second valve portion when the latter is in said closed position.

3. An oil filter as defined in claim 2 in which said surface comprises an annular rib projecting from one side of said plate.

4. An oil filter as defined in claim 1 further including a coiled compression spring telescoped over said sleeve and biasing said first valve portion of said valve member against said flange.

5. An oil filter comprising a housing, a tubular filter element located in said housing and having inner and outer walls, said filter element being operable to screen contaminants from oil passing through the filter element from said outer wall to said inner wall, a plate joined to one end of said housing in axially spaced relation with said filter element, a series of angularly spaced inlet openings formed through said plate for admitting oil into said housing, a sleeve joined to said plate near the center thereof and having a center bore defining an outlet opening for discharging oil from said housing, there being a series of angularly spaced and radially extending ports formed through said sleeve and communicating with said outlet opening, oil normally flowing through said inlet openings to the outer wall of said filter element, flowing through said filter element to the inner wall thereof, and then flowing out of said outlet opening, valve means for controlling the flow of oil between said inlet openings and said outlet opening said valve means comprising a flange formed integrally with and projecting radially outwardly from said sleeve and having angularly spaced passages which are operable when open to allow oil to flow directly from said inlet openings to said outlet opening by way of said ports, said valve means also comprising a ring made of resiliently yieldable material telescoped over said sleeve and having an inner peripheral portion defining a first valve portion, a coiled compression spring telescoped over said sleeve, retaining means encircling said sleeve and compressing said spring so as to cause said spring to bias said first valve portion against said flange to cause said first valve portion to normally close said passages and prevent oil from flowing directly from said inlet openings to said ports and said outlet opening, said valve member having an outer peripheral portion defining a second valve portion, said second valve portion being biased against said plate by virtue of the resiliency of said material and normally preventing oil from flowing between said inlet openings and the outer wall of said filter element, said second valve portion normally yielding when said inlet openings are pressurized and permitting oil to flow from said inlet openings to said outlet opening by way of said filter element, and said first valve portion moving against the bias of said spring and opening said passages when said inlet openings are pressurized and the pressure differential between said inlet and the inner wall of said filter element exceeds a predetermined value whereby oil bypasses said filter element and flows directly form said inlet openings to said outlet opening by way of said passages and said ports.

6. An oil filter as defined in claim 5 further comprising an annular rib projecting from one side of said plate and defining a seat for said second valve portion when the latter is in said closed position.

7. An oil filter as defined in claim 5 which said valve member includes an intermediate section disposed in a generally radial plane, said first valve portion normally lying in said plane and being hinged to said intermediate section to swing out of said plane to open said passages, and said second valve portion comprising a skirt extending around and projecting generally axially from the outer periphery of said intermediate section and hinged to swing toward said plane.

8. An oil filter as defined in claim 7 further including an annular bead projecting axially from the intermediate section of said valve member and encircling the outer periphery of said flange to help keep said valve member centered with respect to said flange.

9. An oil filter as defined in claim 8 further including an axially facing annular groove formed in said first valve portion and receiving one of the end coils of said spring.

10. An oil filter as defined in claim 8 in which said retaining means comprise an annular collar telescoped over said sleeve and extending from said sleeve to the inner wall of said filter element, one of the end coils of said spring bearing against said collar.

11. An oil filter as defined in claim 10 in an annular and axially facing groove is formed in said collar and receives said one end coil of said spring.

* * * * *